Dec. 13, 1927.
E. C. MILLER
1,652,449
SIGNALING MECHANISM CIRCUIT CLOSER FOR VEHICLES
Filed Feb. 23, 1922
4 Sheets-Sheet 1
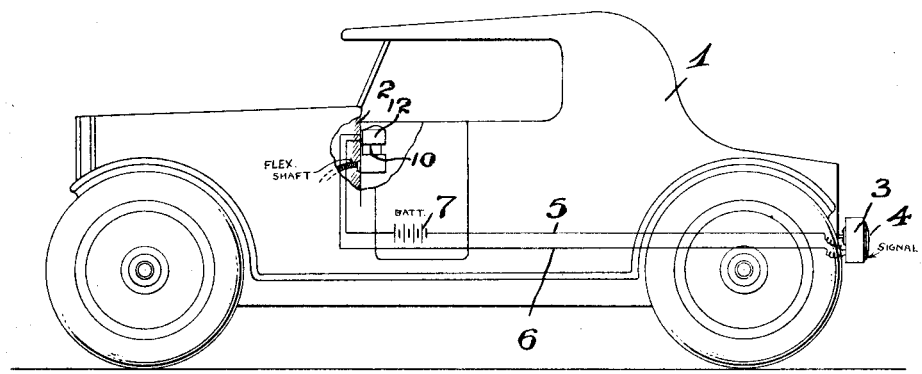
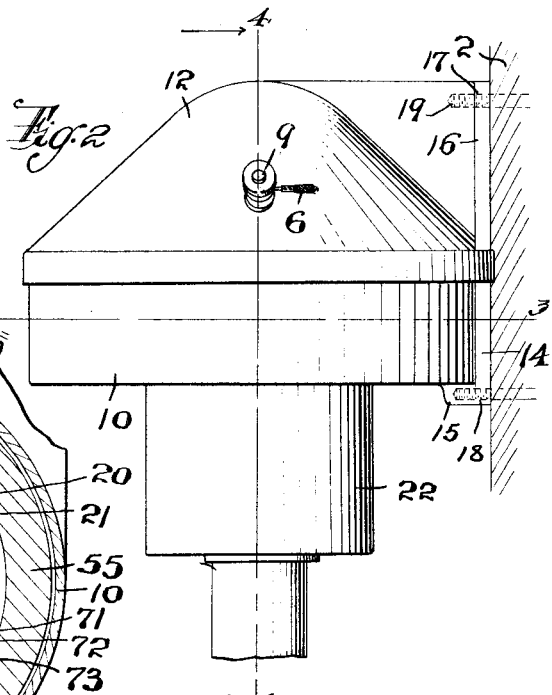
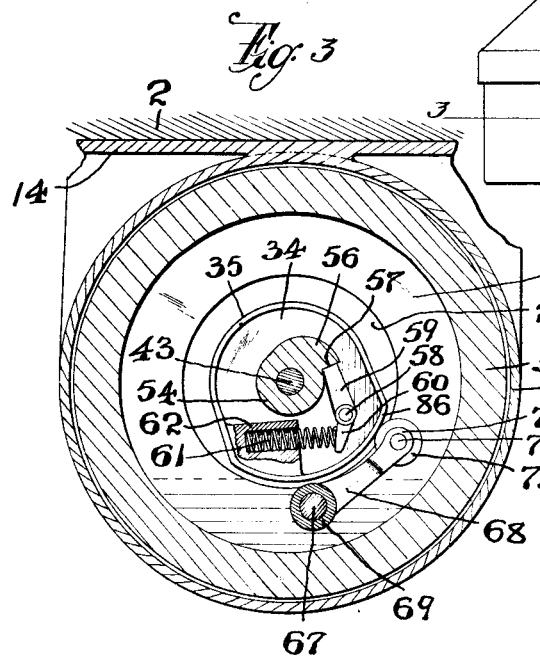
INVENTOR:
Eseck C. Miller,
BY
Braentzel and Richards,
ATTORNEYS Dec. 13, 1927.
E. C. MILLER
SIGNALING MECHANISM CIRCUIT CLOSER FOR VEHICLES
Filed Feb. 23, 1922
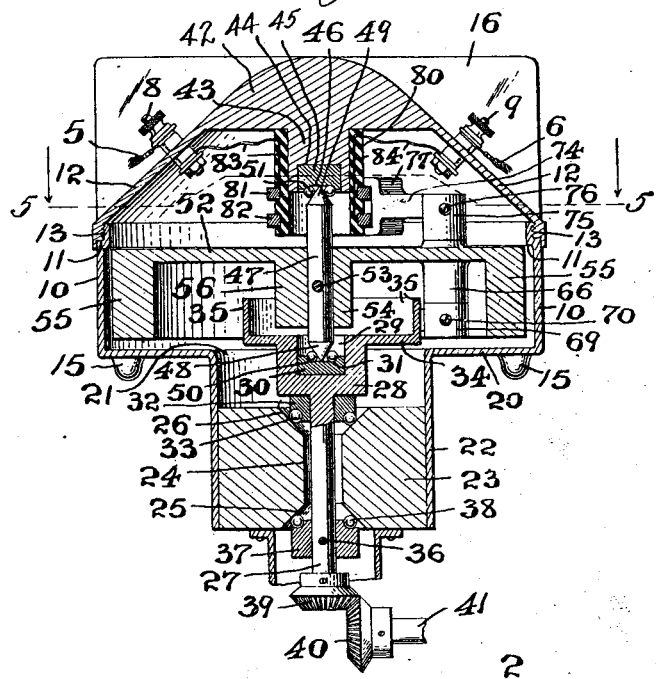
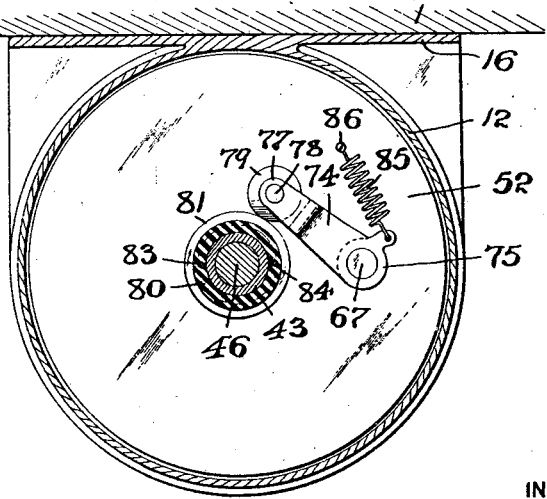
INVENTOR:
Enoch C. Miller,
BY
Fraentzel and Richards,
ATTORNEYS

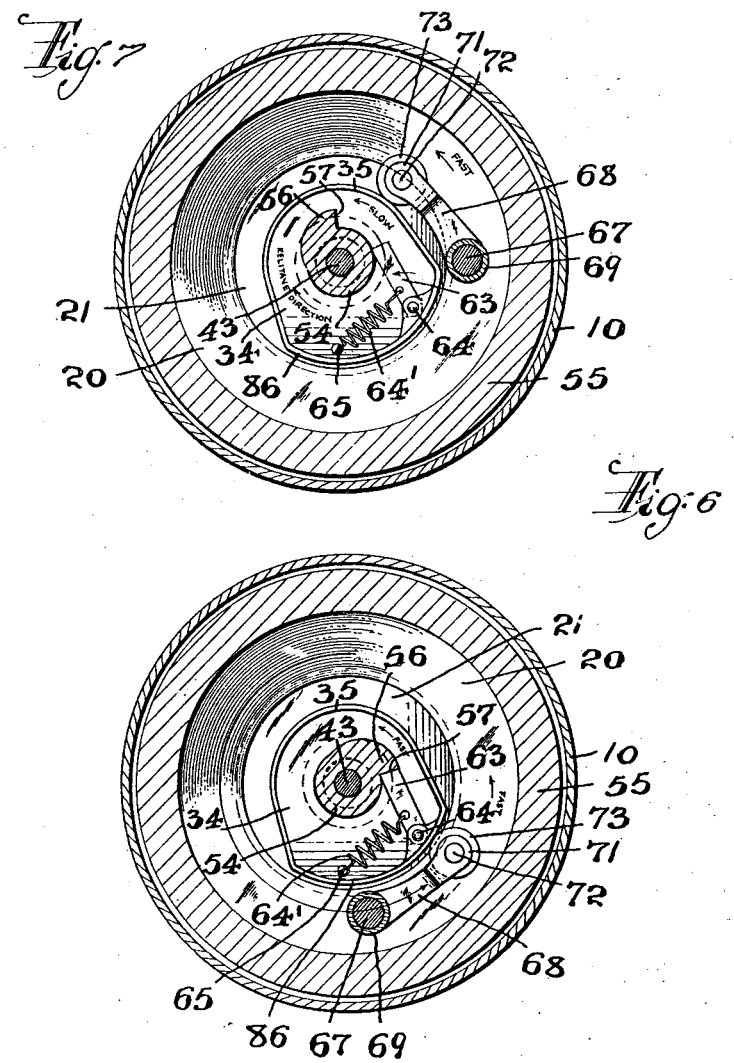

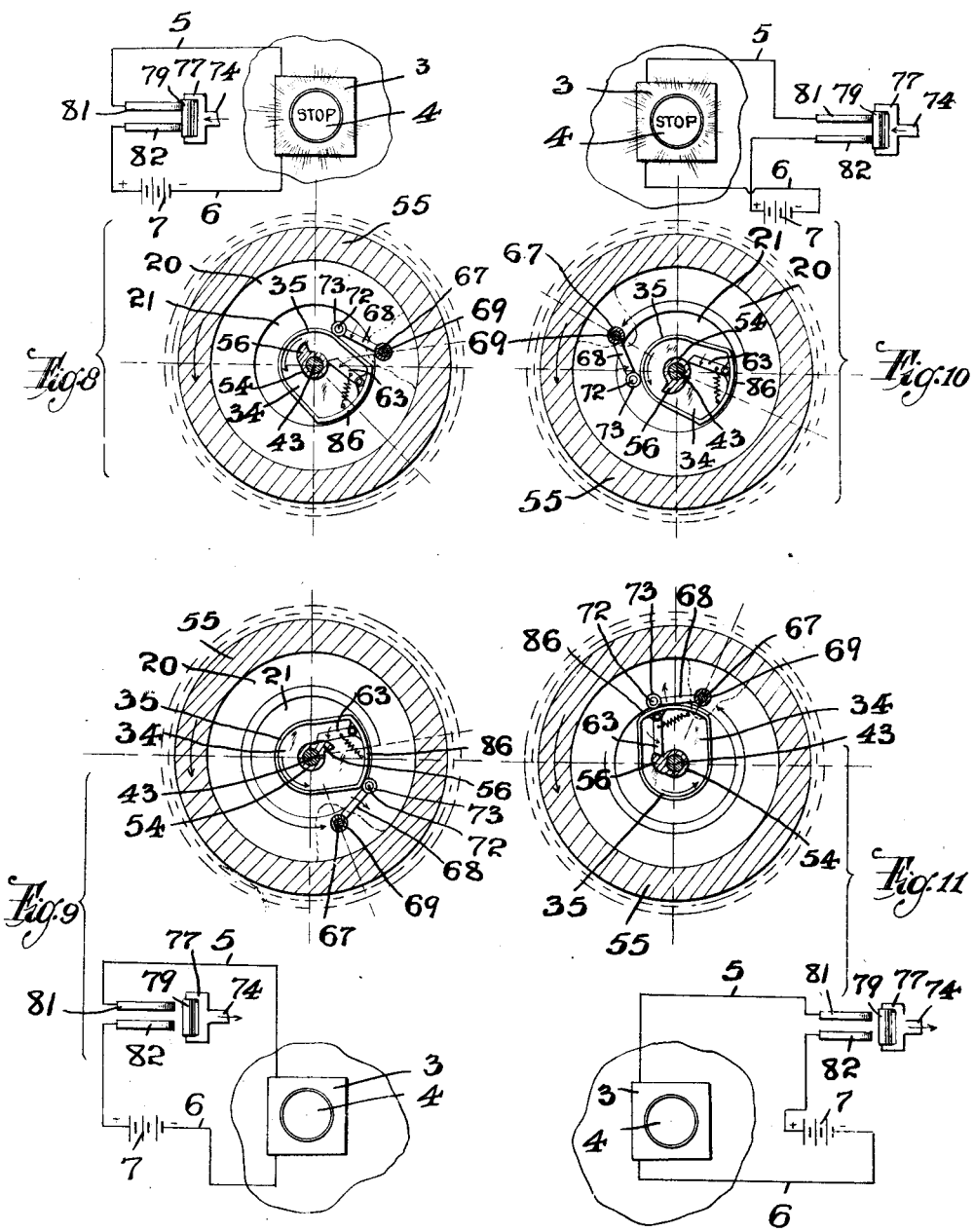

Patented Dec. 13, 1927.

1,652,449

UNITED STATES PATENT OFFICE.

ESECK C. MILLER, OF NEWARK, NEW JERSEY.

SIGNALING-MECHANISM CIRCUIT CLOSER FOR VEHICLES.

Application filed February 23, 1922. Serial No. 538,621.

This invention relates, generally, to improvements in signaling devices for vehicles; and, the present invention has reference, more particularly, to a novel and efficient signaling device, which is automatic in its operation in indicating to the operator of another vehicle following such signal-provided vehicle, the intention of the operator in the leading vehicle that he is going to slow down, either for the purposes of stopping or for turning to the right or left.

The present invention has reference, furthermore, to an automatically operating signaling device controlled by the speeds of the vehicle, the mechanical features of the device being suitably attached to a face of the instrument board of the vehicle, or to any other suitable part of the vehicle, and the device comprising in addition, a danger-indicating signal for attachment to the rear of the vehicle, the device being adapted for use in the day-time, as well as at night, and the means for actuating the signal, in this case an electrical make and break-mechanism, being operated by the centrifugal force of an element, actuated by the speed of the vehicle.

The present invention has for its principal object to provide a novel, simple and cheap, as well as an efficiently operating signaling device, the mechanism of which is primarily set in motion by the speed at which the vehicle is being operated, but certain elements of the mechanism owing to momentum or centrifugal force, continuing to move, for a time, at the initial speed of the vehicle to actuate an electrically connected signaling means, simultaneously with a reduction of the speed of the vehicle, immediately in advance of the stopping of the vehicle, or to the turning of the same to either side.

The invention has for its further object to provide a signaling device of the general character hereinafter more fully set forth, in which an electrical signaling lamp for vehicles, and the like, is automatically and intermittently flashed during any reduction in the speed of the vehicle, irrespective of any the speed at which the vehicle was being initial speed at which the vehicle was being propelled; and, furthermore, to provide an electrically lighted signaling device, in which an electric circuit may be established by means of a contact making mechanism which is operated from a speed-actuated momentum-disc or wheel, irrespective of any other mechanical actuating mechanism, such as the brake-levers or pedals, or a manually operated actuating means, such as is now ordinarily the case.

Other objects of the present invention not at this time more particularly enumerated, will be more fully understood from the following detailed description of the said invention.

With the various objects of the present invention in view, the said invention consists, primarily, in the novel automatically operated signaling device for vehicles hereinafter set forth; and, the said invention consists, furthermore, in the novel arrangements and combinations of the various devices and parts, as well as in the details of the construction of the same, all of which will be more fully described in the following specification, and then finally embodied in the clauses of the claim, which are appended to and which form an essential part of the said specification.

The invention is clearly illustrated in the accompanying drawings, in which:—

Figure 1 is a side elevation of a vehicle, as an automobile, provided with a signaling device embodying the principles of the present invention.

Figure 2 is a side elevation, made on an enlarged scale, of a box or casing adapted to be secured to either side of the instrument board, or other suitable part of the vehicle, containing the main mechanical elements of the device; and Figure 3 is a horizontal sectional representation of the same, said sectional being taken on line 3—3 in said Figure 2, said view showing certain elements of the mechanism in their initial positions, when the vehicle is running under maximum speeds, and at which times, the electric signaling lamp, being cut out of circuit, is not illuminated.

Figure 4 is a transverse vertical sectional representation, taken on line 4—4 in said Figure 2, looking in the direction of the arrow; and Figure 5 is a horizontal sectional representation of the device, said section being taken on line 5—5 in said Figure 4, said view showing the several parts in their relative positions, when an electric circuit is automatically established, for illumination of the electric signaling lamp at the rear of the vehicle.

Figure 6 is a horizontal sectional representation, similar to the section represented in said Figure 3, showing a slight modification of the parts represented in said Figure 3; and Figure 7 is a similar sectional representation of the elements represented in said Figure 6, showing said elements in their relative positions, when the elements represented in Figure 5 are automatically establishing an electrical contact.

Figures 8, 9, 10 and 11 are diagrammatical representations of the signaling device, said several views indicating more particularly the manner of intermittently making and breaking electrical contacts, for the intermittent illumination or flashing of the indicating lamp, located at the rear end of the vehicle.

Similar characters of reference are employed in all of the said above described views, to indicate corresponding parts.

Referring now to the several figures of the drawings, the reference character 1 indicates a suitable vehicle, as an automobile, in which the reference-character 2 indicates a portion of the instrument board of the vehicle, and upon which vehicle is suitably attached, at the rear thereof, a lamp-casing 3 provided with the usual electric bulb, and with the usual glass lens, as 4, in red, and which may bear the word "Stop", as indicated in Figures 8 and 10 of the drawings. Leading from the electric light bulb within said lamp-casing 3 are the circuit-wires 5 and 6, in one of which is located the electric battery 7, said wires being attached at their opposite ends, respectively to binding posts 8 and 9, located at suitable points in the cover, or other suitable portion of the box or casing in which the actuating and operating elements of the signaling device, embodying the principles of the present invention are located and operated in a manner to be presently more fully set forth.

The said box or casing which is preferably of a cylindrical conformation consists, essentially of a lower body-portion 10 formed with an annular screw-threaded flange, as 11, upon which is screwed the lower internally screw-threaded marginal rim 13 of a suitably formed cap or closure, as 12, with which the previously mentioned binding posts 8 and 9 are suitably connected, substantially as shown in Figure 4 of the drawings. In order to attach the connected members 10 and 12 to the face of the instrument board of the vehicle, the said body-portion 10 is made with a vertically disposed plate-like element, as 14, usually formed with screw-receiving sockets 15, the said cap or closure 12 being similarly made with a vertically disposed plate-like element, as 16, formed with screw-receiving sockets 17, for the reception of the tightening screws or bolts 18 and 19, as will be evident from an inspection of Figure 2 of the drawings. It will be understood, however, that any other suitable means may be employed for securing the connected members 10 and 12 to the instrument board or to any other suitable portion of the framework of the vehicle; and, it will further be understood that the said body-portion 10 and the said cap or closure 12 may be otherwise connected and secured together, as will be clearly evident.

As shown, the said body-portion 10 is provided in its bottom 20, with a centrally disposed opening 21, and a downwardly extending cylindrical hub 22, in which is suitably secured a cylindrical block, as 23, formed with a centrally disposed duct 24, provided at its lower and upper portions, respectively, with the cone-shaped bearing-seats 25 and 26. Rotatably disposed within said duct 24 is a spindle 27, the upper portion of which projects suitably above said block 23, being provided with an enlargement, as 28, having a receiving socket or depression, as 29, for the reception therein of a bearing-plate 30, formed with a cone-shaped bearing-seat, as 31. Suitably mounted upon said spindle 27, directly beneath said enlargement 28, is a brass or other suitable bearing-ring 32, between which and the said bearing-seat 26, is an arrangement of anti-friction rollers or ball-bearings, as 33. Connected with and eccentrically disposed with relation to said enlargement 28 is a plate-like member or element, as 34, bounded by an upwardly extending marginal rim or flange 35, which forms a cam-surface of the general configuration shown in the several figures of the drawings, but which may be of any other cam-shape, if desired. The lower end-portion of said spindle 27, projects from and beneath the lower bearing-seat 25 in the block 23, having secured thereon, by means of a pin 36, or other fastening means, a brass or other suitably formed bearing-ring 37, between which and the said bearing-seat 25, is an arrangement of anti-friction rollers or ball-bearings 38. Suitably mounted and secured upon the extreme lower end-portion of said spindle 27 is a bevel-wheel or miter-gear 39, with which meshes another bevel-wheel or miter-gear 40, connected with the usual flexible speedometer drive-chain 41 of the vehicle, for producing rotary motion of the spindle 27, as will be understood. Of course, I am aware, that the said spindle 27 may be variously driven, and for that reason any other suitably arranged driving means actuated from any part of a power-drivin vehicle may be employed.

Depending from the solid portion 42 of the previously mentioned cap or closure 12 is a block-like portion, as 43, formed with a receiving socket or depression 44 in which is suitably fixed a bearing-block 45 formed with a bearing-seat, as 46. Rotatably disposed between the bearing-seat 31 of the bearing plate 30 and the bearing-seat 46 of the bearing-block 45, are the respective pointed end-portions 48 and 49 of a spindle 47, suitable anti-friction rollers or ball-bearings 50 and 51 being preferably used with the respective parts, substantially as shown in said Figure 4 of the drawings. Suitably secured in a fixed position upon said spindle 47, by means of a pin 53, or otherwise, is the hub 54 of a momentum disc or wheel 52, which is bounded by a comparatively heavy and downwardly extending marginal rim or flange, as 55. The said hub 54, as will be seen from an inspection of Figures 3, 6 and 7 of the drawings, has an eccentrically extending portion, as 56, formed with an off-set or shoulder, as 57, with which can be brought into active engagement, in a manner hereinafter more fully described, a spring-actuated and pivotally disposed pawl or dog. Two styles of such pawls or dogs are shown in the accompanying drawings, the construction shown in Figure 3 of the drawings, comprising a post 58 connected with and extending in an upward direction from the previously mentioned plate-like member or element 34, upon which is oscillatorily arranged a pawl or dog comprising the two members 59 and 60. In engagement with the side of one of said members, as 60, is one end of a coiled spring 61, the other end-portion of said spring being arranged in a socketed portion 62 extending inwardly from the cam-flange or rim 35 of the said plate or member 34. As shown in Figures 6 and 7 of the drawings, a pawl or dog 63 may be used, said dog or pawl 63 being pivotally attached, as at 64, to the inner surface-portion of the marginal rim or flange 35 of the plate-like element 34, the said pawl or dog 63 being adapted to be forced into action against the eccentrically extending portion 56 and its offset or shoulder 57 of the hub 54 of the previously mentioned momentum-disc or wheel 52, by a coiled pull-spring 64′, attached at one end to said pawl or dog 63, and at its other end to a pin 65 carried by said plate-like element 34, substantially as shown. Referring now to Figure 4 of the drawings, it will be seen, that the momentum disc or wheel 52 is provided at the proper location with a bearing-member or sleeve, as 66, in which is oscillatorily disposed a pin or stem 67 having its end-portions projecting from said bearing-member or sleeve 66, on opposite sides of the said disc or wheel. Mounted upon that portion of said pin or stem 67 which projects from the bearing-member or sleeve 66 upon the lower side of said momentum-disc or wheel is the hub 69 of an arm 68, being secured to said pin or stem 67, by means of a set-screw 70, or other fastening means, so as to move with said pin or stem, said arm 68 being forked at its free end, as at 71, and having mounted in said forked end, upon a pin 72, a roller 73 adapted to roll upon the cam-surface of the marginal rim or flange 35 of the plate-like element 34, as will be clearly evident from an inspection of Figures 6 and 7 of the drawings. Mounted upon the opposite end-portion of said pin or stem 67 which projects from the bearing-member or sleeve 66 upon the upper side of the momentum-disc or wheel is the hub 75 of an arm 74, being secured to said pin or stem 67, by means of a set-screw 76, or other fastening means, so as to move with said pin or stem, said arm 74 being forked at its free end, as at 77, and having mounted in its forked end, upon a pin 78, a contact-making roller 79.

A coiled spring 85 is also suitably attached at one end to said arm 74, and at its other end by means of a pin or post 86 carried by the momentum-disc or wheel 52, the purpose of this spring being, primarily, to cause the roller 73 of the arm 68 at all times to be maintained in its rolling contact with the cam-surface of the marginal rim or flange 35.

The previously mentioned block-like portion 43 of the cap or closure 12 is surrounded by a sleeve 80 of insulating material, said sleeve being suitably secured thereon and being provided with a pair of metal contact rings 81 and 82 with which the said contact-making roller 79 is adapted at times to be brought into rolling contact for the purposes to be presently more fully described.

As shown in said Figure 4 of the drawings, the contact-ring 81 has connected therewith a wire 83 which in turn is attached to the binding post 8, and similarly the contact-ring 82 has connected therewith a wire 84 which in turn is attached to the binding post 9, all for completing an electric circuit, when contact is made by the roller 79, through the circuit-wires 5 and 6, the electric battery 7, and the electric lamp at the rear of the vehicle.

Having in the foregoing fully described in a complete apparatus one embodiment of the principles of the present invention, I will now briefly set forth the general operation of the devices and parts for intermittently completing and interrupting the electric circuit for intermittently flashing the danger-signal, as the speed of the vehicle is reduced from that of a given speed.

For example, suppose the vehicle is driven at the rate of say thirty miles an hour. At this time, the pawls or dogs, shown in Figures 3, or 6 and 7, are in active engagement with the off-set or shoulder 57 of the hub 54, thus causing the momentum-disc or wheel to move simultaneously with and at the same speed as the spindle 27, which is operated from the speedometer drive-chain 41, as will be evident. The roller 73, carried by the arm 68 at this time is in contact with the arc-portion 86 of the rim or flange 35, and the arm 74 and its roller 79 being in such relative position with the arm 68 and its roller 73, that the roller 79 is sufficiently moved away from the contact-rings 81 and 82 so that no electrical contact is made, and hence the danger-light will not be illuminated. However, should the speed of the vehicle be reduced, say to twenty-nine miles per hour, or less, or even if the vehicle be brought to a stop, then the momentum of the disc or wheel 52 causes the same to continue to revolve at the initial speed, in this instance, at thirty miles per hour, whereby the spring 85 causes the cam 68 to move toward and the roller 73 to roll upon the smaller arc-shaped portion 87 of the cam-shaped rim or flange 35, and simultaneously brings the roller 79 of the arm 74 in rolling contact with the two contact-rings 81 and 82, to establish an electric circuit and to illuminate the danger-signal at the rear of the vehicle. This danger lamp will continue to be intermittently lighted and extinguished, as long as the momentum-wheel or disc 52 continues to rotate, and until such time that its force has been expended, as will be clearly evident.

The same results take place no matter what the initial driving or running speed of the vehicle may be, whether twenty-five or less or more miles per hour, no danger-signal or light being shown, unless the speed of the vehicle drops below said twenty-five miles per hour, or below any other initial speed at which the vehicle is running.

From the foregoing description, and from an inspection of the several figures of the drawings, and more especially from Figures 8, 9, 10 and 11, in which the various operations of the device are diagrammatically represented, it will be seen that I have produced a simple and efficiently operating mechanism, which is automatic in its operation to produce a danger-signal immediately that the speed of the vehicle is reduced, no matter what the initial speed, and which is not dependent upon manually controlled or operated mechanism, to give warnings of the various slowing up or turning out movements of the vehicle.

Of course, I am fully aware, that changes may be made in the general arrangements and combinations of the various devices and parts, as well as in the details of the construction of the said parts, without departing from the scope of the present invention as set forth in the foregoing specification, and as defined in the clauses of the claim which are appended thereto. Hence, I do not limit my present invention to the exact arrangements and combinations of the various devices and parts as described in the said specification, nor do I confine myself to the exact details of the construction of the said parts, as illustrated in the accompanying drawings.

I claim:—

1. A switch-structure adapted to be associated with an electrically operated signal, comprising a main spindle directly operated from the vehicle, a second spindle independent from said main spindle, a momentum element carried by said second spindle, and an intermediately disposed mechanism for primarily rotating said second spindle and momentum-element at the same speed as the main spindle, but operating differentially at a reduced speed of the main spindle, to cause said momentum-element to establish an electric circuit and thereby operate the signal.

2. A switch-structure adapted to be associated with an electrically operated signal, comprising a circuit-making and breaking device comprising a main chambered shell and a cap, a spindle rotatably disposed within said shell, means actuated from the speed of the vehicle for correspondingly rotating said spindle, a plate carried by said spindle, and a bearing carried by said plate, said plate being bounded by a cam-shaped marginal rim, a bearing connected with said cap, and a spindle mounted between said bearings, a momentum-disc mounted upon said last-mentioned spindle, means carried by said plate and adapted to engage said momentum-disc for causing said disc to rotate simultaneously with said first-mentioned spindle and the plate mounted thereon, and means carried by said momentum disc and adapted to be actuated from said cam-shaped marginal rim for automatically making and breaking an electric circuit and operating said signal.

3. A switch-structure adapted to be associated with an electrically operated signal, comprising a circuit-making and breaking device comprising a main chambered shell and a cap, a spindle rotatably disposed within said shell, means actuated from the speed of the vehicle for correspondingly rotating said spindle, a plate carried by said spindle, and a bearing carried by said plate, said plate being bounded by a cam-shaped marginal rim, a bearing connected with said cap, and a spindle mounted between said bearings, a momentum-disc mounted upon said last-mentioned spindle, means carried by said plate and adapted to engage said momentum-disc for causing said disc to rotate simultaneously with said first-mentioned spindle and the plate mounted thereon, a block connected with said cap, an insulating sleeve mounted upon said block, contact-rings carried by said sleeve, electric circuit-wires connecting said rings in circuit with said signal, a bearing-member connected with said momentum-disc, a stem oscillatorily disposed in said bearing-member, said stem projecting on opposite sides of said momentum-disc, an arm mounted upon the lower end-portion of said stem, and a roller carried by said arm in rolling contact with said cam-shaped marginal rim, a spring-actuated arm mounted upon the upper end-portion of said stem, and a roller carried by said last-mentioned arm adapted to be moved into and out of electrical contact with said contact-rings for making and breaking the electric circuit between said rings and said signal.

4. A switch-structure adapted to be associated with an electrically operated signal, comprising a circuit-making and breaking device comprising a main chambered shell and a cap, a spindle rotatably disposed within said shell, means actuated from the speed of the vehicle for correspondingly rotating said spindle, a plate carried by said spindle, and a bearing carried by said plate, said plate being bounded by a cam-shaped marginal rim, a bearing connected with said cap, and a spindle mounted between said bearings, a momentum-disc provided with a hub for mounting said disc upon said last-mentioned spindle, said hub being formed with an eccentrically disposed portion formed with a shoulder, a spring-actuated dog carried by said plate, said dog being adapted to be brought into engagement with said shoulder, for causing said momentum-disc to rotate simultaneously with said first-mentioned spindle and the plate mounted thereon, and means carried by said momentum-disc and adapted to be actuated from said cam-shaped marginal rim for automatically making and breaking an electric circuit and operating said signal.

5. A switch-structure adapted to be associated with an electrically operated signal, comprising a circuit-making and breaking device comprising a main chambered shell and a cap, a spindle rotatably disposed within said shell, means actuated from the speed of the vehicle for correspondingly rotating said spindle, a plate carried by said spindle, and a bearing carried by said plate, said plate being bounded by a cam-shaped marginal rim, a bearing connected with said cap, and a spindle mounted between said bearings, a momentum-disc provided with a hub for mounting said disc upon said last-mentioned spindle, said hub being formed with an eccentrically disposed portion formed with a shoulder, a spring-actuated dog carried by said plate, said dog being adapted to be brought into engagement with said shoulder, for causing said momentum-disc to rotate simultaneously with said first-mentioned spindle and the plate mounted thereon, a block connected with said cap, an insulating sleeve mounted upon said block, contact-rings carried by said sleeve, electric circuit-wires connecting said rings in circuit with said signal, a bearing-member connected with said momentum-disc, a stem oscillatorily disposed in said bearing-member, said stem projecting on opposite sides of said momentum-disc, an arm mounted upon the lower end-portion of said stem, and a roller carried by said arm in rolling contact with said cam-shaped marginal rim, a spring-actuated arm mounted upon the upper end-portion of said stem, and a roller carried by said last-mentioned arm adapted to be moved into and out of electrical contact with said contact-rings for making and breaking the electric circuit between said rings and said signal.

6. A switch-structure adapted to be associated with an electrically operated signal, comprising a circuit making and breaking device comprising a main chambered shell formed with a hub, and a cap mounted upon said shell, said cap being provided with an inwardly extending block formed with a receiving portion, a bearing-member mounted in the hub of said shell, a spindle rotatably mounted in said bearing-member, means actuated from the speed of the vehicle for correspondingly rotating said spindle, a plate carried by said spindle, said plate being provided with a receiving portion, a bearing-block in said receiving portion, said plate being bounded by a cam-shaped marginal rim, a bearing-block mounted in the bearing-portion of the block of said cap, and a spindle mounted between said bearing-blocks, a momentum-disc mounted upon said last-mentioned spindle, means carried by said plate and adapted to engage said momentum-disc for causing said disc to rotate simultaneously with said first-mentioned spindle and the plate thereon, and means carried by said momentum-disc and adapted to be actuated from said cam-shaped marginal rim for automatically making and breaking an electric circuit and operating said signal.

7. A switch-structure adapted to be associated with an electrically operated signal, comprising a circuit making and breaking device comprising a main chambered shell formed with a hub, and a cap mounted upon said shell, said cap being provided with an inwardly extending block formed with a receiving portion, a bearing-member mounted in the hub of said shell, a spindle rotatably mounted in said bearing-member, means actuated from the speed of the vehicle for correspondingly rotating said spindle, a plate carried by said spindle, said plate being provided with a receiving portion, a bearing-block in said receiving portion, said plate being bounded by a cam-shaped marginal rim, a bearing-block mounted in the bearing-portion of the block of said cap, and a spindle mounted between said bearing-blocks, a momentum-disc mounted upon said last-mentioned spindle, means carried by said plate and adapted to engage said momentum-disc for causing said disc to rotate simultaneously with said first-mentioned spindle and the plate thereon, a block connected with said cap, an insulating sleeve mounted upon said block, contact-rings carried by said sleeve, electric circuit-wires connecting said rings in circuit with said signal, a bearing member connected with said momentum-disc, a stem oscillatorily disposed in said bearing-member, said stem projecting on opposite sides of said momentum-disc, an arm mounted upon the lower end-portion of said stem, and a roller carried by said arm in rolling contact with said cam-shaped marginal rim, a spring-actuated arm mounted upon the upper end-portion of said stem, and a roller carried by said last-mentioned arm adapted to be moved into and out of electrical contact with said contact-rings for making and breaking the electric circuit between said rings and said signal.

8. A switch-structure adapted to be associated with an electrically operated signal, comprising a circuit making and breaking device comprising a main chambered shell formed with a hub, and a cap mounted upon said shell, said cap being provided with an inwardly extending block formed with a receiving portion, a bearing-member mounted in the hub of said shell, a spindle rotatably mounted in said bearing-member, means actuated from the speed of the vehicle for correspondingly rotating said spindle, a plate carried by said spindle, said plate being provided with a receiving portion, a bearing-block in said receiving portion, said plate being mounted in the bearing-portion of the block of said cap, and a spindle mounted between said bearing-blocks, a momentum-disc provided with a hub for mounting said disc upon said last-mentioned spindle, said hub being formed with an eccentrically disposed portion formed with a shoulder, a spring-actuated dog carried by said plate, said dog being adapted to be brought into engagement with said shoulder, for causing said momentum-disc to rotate simultaneously with said first-mentioned spindle and the plate mounted thereon, and means carried by said momentum-disc and adapted to be actuated from said cam-shaped marginal rim for automatically making and breaking an electric circuit and operating said signal.

9. A switch-structure adapted to be associated with an electrically operated signal, comprising a circuit making and breaking device comprising a main chambered shell formed with a hub, and a cap mounted upon said shell, said cap being provided with an inwardly extending block formed with a receiving portion, a bearing-member mounted in the hub of said shell, a spindle rotatably mounted in said bearing-member, means actuated from the speed of the vehicle for correspondingly rotating said spindle, a plate carried by said spindle, said plate being provided with a receiving portion, a bearing-block in said receiving portion, said plate being bounded by a cam-shaped marginal rim, a bearing-block mounted in the bearing-portion of the block of said cap, and a spindle mounted between said bearing-blocks, a momentum-disc provided with a hub for mounting said disc upon said last-mentioned spindle, said hub being formed with an eccentrically disposed portion formed with a shoulder, a spring-actuated dog carried by said plate, said dog being adapted to be brought into engagement with said shoulder, for causing said momentum-disc to rotate simultaneously with said first-mentioned spindle and the plate mounted thereon, a block connected with said cap, an insulating sleeve mounted upon said block, contact-rings carried by said sleeve, electric circuit-wires connecting said rings in circuit with said signal, a bearing-member connected with said momentum-disc, a stem oscillatorily disposed in said bearing-member, said stem projecting on opposite sides of said momentum-disc, an arm mounted upon the lower end-portion of said stem, and a roller carried by said arm in rolling contact with said cam-shaped marginal rim, a spring-actuated arm mounted upon the upper end-portion of said stem, and a roller carried by said last-mentioned arm adapted to be moved into and out of electrical contact with said contact-rings for making and breaking the electric circuit between said rings and said signal.

In testimony, that I claim the invention set forth above I have hereunto set my hand this 31st day of January, 1922.

ESECK C. MILLER.